US010395267B2

(12) United States Patent
Becker et al.

(10) Patent No.: US 10,395,267 B2
(45) Date of Patent: Aug. 27, 2019

(54) METHOD AND SYSTEM FOR CONSUMER AWARD PROGRAM FOR WASHROOM USAGE

(71) Applicant: Kimberly-Clark Worldwide, Inc., Neenah, WI (US)

(72) Inventors: Stephen Becker, Cumming, GA (US); Charlene Dunbar, Liburn, GA (US); Jason Kirkland, Cumming, GA (US); Warren Moede, Atlanta, GA (US); Thomas H Schulz, Roswell, GA (US); Chrissy Sheehan, Media, PA (US); Peter W. Shipp, Jr., Woodstock, GA (US); Paul F. Tramontina, Harleysville, PA (US); Matthew T Zielinski, Darien, CT (US)

(73) Assignee: Kimberly-Clark Worldwide, Inc, Neenah, WI (US)

( * ) Notice: Subject to any disclaimer, the term of this patent is extended or adjusted under 35 U.S.C. 154(b) by 0 days.

(21) Appl. No.: 15/552,612

(22) PCT Filed: Feb. 25, 2015

(86) PCT No.: PCT/US2015/017493
§ 371 (c)(1),
(2) Date: Aug. 22, 2017

(87) PCT Pub. No.: WO2016/137458
PCT Pub. Date: Sep. 1, 2016

(65) Prior Publication Data

US 2018/0018689 A1 Jan. 18, 2018

(51) Int. Cl.

| | |
|---|---|
| ***G06Q 30/02*** | (2012.01) |
| ***H04W 4/00*** | (2018.01) |

(Continued)

(52) U.S. Cl.
CPC ......... *G06Q 30/0233* (2013.01); *G06Q 10/06* (2013.01); *G06Q 10/0639* (2013.01);
(Continued)

(58) Field of Classification Search
CPC .... H04W 4/80; H04W 4/008; G06Q 30/0233; G06Q 10/06; G06Q 10/0639;
(Continued)

(56) References Cited

U.S. PATENT DOCUMENTS 4,756,030 A * 7/1988 Juliver .................... E03C 1/055 137/334
5,031,258 A * 7/1991 Shaw ..................... E03C 1/057 242/563

(Continued)

OTHER PUBLICATIONS

PCT Search Report, dated Sep. 30, 2015.
EPO Search Report, dated Jun. 28, 2018.

*Primary Examiner* — David L Lewis
*Assistant Examiner* — Matthew D Hoel
(74) *Attorney, Agent, or Firm* — Dority & Manning, P.A.

(57) ABSTRACT

A system and control method are provided for encouraging patron use of washrooms at commercial establishments. A plurality of commercial establishments are enrolled in a washroom rewards program, as well as patrons that may frequent or visit such establishments. Respective point values in the washroom rewards program are established for defined washroom activities performed by the patrons in the washrooms of the commercial establishments. The identity and location of the commercial establishments are provided to the patrons. Upon the patrons performing one of the defined washroom activities in one of the commercial establishments, the patron is identified and awarded credit of the points for the defined activity to a player account assigned to the patron. Provisions are made for the patrons to redeem accumulated points in their respective account for an award.

14 Claims, 4 Drawing Sheets

(51) Int. Cl.

| | |
|---|---|
| ***G06Q 10/06*** | (2012.01) |
| ***G06Q 20/12*** | (2012.01) |
| ***G06Q 20/38*** | (2012.01) |
| *H04W 4/80* | (2018.01) |

(52) U.S. Cl.
CPC ..... *G06Q 10/06398* (2013.01); *G06Q 20/127* (2013.01); *G06Q 20/387* (2013.01); *G06Q 30/02* (2013.01); *G06Q 30/0207* (2013.01); *H04W 4/80* (2018.02)

(58) Field of Classification Search
CPC ........... G06Q 10/06398; G06Q 20/127; G06Q 20/387; G06Q 30/02; G06Q 30/0207
See application file for complete search history.

(56) References Cited

U.S. PATENT DOCUMENTS 5,202,666 A * 4/1993 Knippscheer ............ G08B 7/06 340/541
5,610,589 A * 3/1997 Evans .................. G08B 21/245 340/573.1
5,771,925 A * 6/1998 Lewandowski ...... A47K 5/1217 137/552.7
5,793,653 A * 8/1998 Segal ....................... G07C 1/10 134/57 R
5,808,553 A * 9/1998 Cunningham ....... G08B 21/245 340/528
5,812,059 A * 9/1998 Shaw ................... G08B 21/245 340/539.1
5,900,801 A * 5/1999 Heagle ................... G06Q 50/12 340/286.09
5,939,974 A * 8/1999 Heagle ................... G06Q 10/06 340/286.09
5,945,910 A * 8/1999 Gorra ................... G08B 21/245 340/573.1
5,952,924 A * 9/1999 Evans ................ G08B 21/0286 340/528
5,966,753 A * 10/1999 Gauthier .................. A47K 5/12 4/623
6,131,587 A * 10/2000 Chardack ............... A47K 10/46 134/102.3
6,147,607 A * 11/2000 Lynn .................... A47K 13/105 106/31.32
6,236,317 B1 * 5/2001 Cohen .................. G08B 21/245 137/552.7
6,236,953 B1 * 5/2001 Segal ....................... G07C 1/10 702/127
6,278,372 B1 * 8/2001 Velasco, Jr. .......... G08B 21/245 340/309.7
6,360,181 B1 * 3/2002 Gemmell ............. A47K 5/1202 340/675
6,392,546 B1 * 5/2002 Smith .................. G08B 21/245 222/105
6,411,920 B1 * 6/2002 McConnell ............ A47K 10/42 242/564.1
6,426,701 B1 * 7/2002 Levy ...................... G08B 21/24 137/552.7
6,542,568 B1 * 4/2003 Howes, Jr. ........... A47K 5/1217 377/16
6,577,240 B2 * 6/2003 Armstrong ........... A47K 5/1217 340/573.1
6,707,873 B2 * 3/2004 Thompson ........... A47K 5/1208 377/13
6,882,278 B2 * 4/2005 Winings ............... G08B 21/245 340/573.1
6,883,563 B2 * 4/2005 Smith .................. A47K 5/1202 141/102
6,975,231 B2 * 12/2005 Lane ...................... G16H 40/20 340/573.1
7,015,816 B2 * 3/2006 Wildman ............ G06F 19/3418 340/573.1
7,236,097 B1 * 6/2007 Cunningham ....... G08B 21/245 340/309.7
7,242,307 B1 * 7/2007 LeBlond .............. G08B 21/245 340/573.1
7,372,367 B2 * 5/2008 Lane ...................... G16H 40/20 340/573.1
7,597,122 B1 * 10/2009 Smith .................. A47K 5/1202 141/114
7,605,704 B2 * 10/2009 Munro ................. G08B 21/245 340/10.1
7,616,122 B2 * 11/2009 Bolling ............. G07C 9/00031 340/573.1
7,659,824 B2 * 2/2010 Prodanovich ............. B08B 3/04 340/572.1
7,682,464 B2 * 3/2010 Glenn ....................... B08B 3/04 134/56 R
7,698,770 B2 * 4/2010 Barnhill ................. A46B 13/02 15/21.1
7,734,476 B2 * 6/2010 Wildman ............... G06Q 50/22 705/2
7,783,380 B2 * 8/2010 York ........................ A47K 5/06 700/240
7,804,409 B2 * 9/2010 Munro ................. G08B 21/245 222/52
7,818,083 B2 * 10/2010 Glenn .................... G06Q 10/00 700/108
7,855,651 B2 * 12/2010 LeBlond .......... G06Q 10/06398 340/573.1
7,898,407 B2 * 3/2011 Hufton ...................... G01S 1/70 340/539.11
8,085,155 B2 * 12/2011 Prodanovich ........ G08B 21/245 340/572.1
8,094,029 B2 * 1/2012 Ortiz ............... G06Q 10/06398 340/573.1
8,110,047 B2 * 2/2012 Glenn .................. G08B 21/245 134/18
8,237,558 B2 * 8/2012 Seyed Momen ......... G01S 1/70 340/539.11
8,350,706 B2 * 1/2013 Wegelin ................. G16H 40/20 340/573.1
8,377,229 B2 * 2/2013 Barnhill ................. G16H 40/20 134/56 R
8,395,515 B2 * 3/2013 Tokhtuev ............ G08B 21/245 340/603
8,400,309 B2 * 3/2013 Glenn .................... G16H 40/20 340/573.1
9,613,518 B2 * 4/2017 Dunn ................. G06K 9/00335
9,641,994 B2 * 5/2017 Balsan ................... G06Q 20/18
9,659,481 B2 * 5/2017 Himmelmann ............................. G06Q 10/063118
9,721,452 B2 * 8/2017 Felch ..................... G16H 40/20
9,972,193 B2 * 5/2018 Laufer .................... H04W 4/02
10,008,098 B2 * 6/2018 Ophardt ............. G06K 7/10425
10,037,678 B2 * 7/2018 Becker ................... G16H 40/20
2002/0135486 A1 * 9/2002 Brohagen ............ G08B 21/245 340/573.1
2002/0175182 A1 * 11/2002 Matthews ............ A47K 5/1217 222/52
2003/0011646 A1 * 1/2003 Levine ................ G06F 19/3418 715/848
2003/0030562 A1 * 2/2003 Lane .................... G08B 21/245 340/573.4
2003/0191692 A1 * 10/2003 Vogel ..................... G06Q 50/12 705/15
2004/0001009 A1 * 1/2004 Winings ............... G08B 21/245 340/870.16
2004/0034289 A1 * 2/2004 Teller ................. A61B 5/02055 600/300
2004/0090333 A1 * 5/2004 Wildman ............ G06F 19/3418 340/573.1
2004/0150527 A1 * 8/2004 Harper ................. G08B 21/245 340/573.1
2004/0193449 A1 * 9/2004 Wildman ............... G06Q 50/22 705/2
2005/0114154 A1 * 5/2005 Wolkowicz ............ G06Q 30/02 340/539.12

(56) References Cited

U.S. PATENT DOCUMENTS

2005/0248461 A1* 11/2005 Lane .................... G08B 21/245 340/573.1
2006/0132316 A1* 6/2006 Wildman ............ G06F 19/3418 340/573.1
2006/0160059 A1* 7/2006 Dompier ................ G06Q 10/10 434/362
2006/0208887 A1* 9/2006 Fields .................... G06Q 10/08 340/572.1
2007/0247316 A1* 10/2007 Wildman .............. A61B 5/1113 340/572.4
2008/0001763 A1* 1/2008 Raja .......................... A61L 2/18 340/573.1
2008/0033751 A1* 2/2008 Greene ................. G06F 19/328 705/2
2008/0103636 A1* 5/2008 Glenn .................... G06Q 10/00 700/302
2009/0091458 A1* 4/2009 Deutsch ................. G06Q 50/22 340/573.1
2009/0119142 A1* 5/2009 Yenni ..................... G06Q 10/06 705/7.15
2009/0276239 A1* 11/2009 Swart ........................ A61L 2/00 705/2
2010/0153374 A1* 6/2010 LeBlond .......... G06Q 10/06398 707/722
2011/0316701 A1 12/2011 Alper et al.
2013/0332184 A1* 12/2013 Burnham ........... G06Q 10/0635 705/2
2014/0364148 A1* 12/2014 Block ..................... H04W 4/02 455/456.3
2015/0228181 A1* 8/2015 Himmelmann .............................. G06Q 10/063118 340/573.1
2016/0048827 A1* 2/2016 Corbalis ............... H04W 4/029 705/71
2016/0088443 A1* 3/2016 Kostka .................... H04W 4/21 455/411
2016/0270029 A1* 9/2016 Herring ................. H04W 68/04
2018/0293874 A1* 10/2018 Ophardt ............. G06K 7/10425

* cited by examiner

METHOD AND SYSTEM FOR CONSUMER AWARD PROGRAM FOR WASHROOM USAGE

FIELD OF THE INVENTION

The present invention relates generally to methods and systems for establishing a consumer recognition or award program wherein patrons earn credit or points for performing washroom events at authorized washrooms.

BACKGROUND

The importance of proper hygiene practices in workplace or public washrooms (including restrooms) is widely recognized. Simply washing one's hands after use of the washroom facilities or after contact with an infectious person or environment is paramount in preventing the spread of disease or illness, particularly in the food and health service sectors. Although employees are generally educated in such practices, adherence to applicable washroom practices can always be improved upon. Negative reinforcement (e.g., disciplinary action) is not a prime motivator in this regard.

With respect to public washroom facilities, such as those facilities in a restaurant, convenience store, or service station, users of such facilities are not accountable to any authority and other, creative motivational means would be beneficial in encouraging the public to adhere to proper washroom practices.

From another aspect, a synergy has not yet been created between marketing a business establishment and use of a washroom facility within the establishment other than the off-hand chance that patrons of a convenience store or service station may purchase an item out of a sense of guilt or obligation for using the establishment's washroom facility. Patrons may be motivated to stop at a particular restaurant or service station because they are loyal to or prefer the products/services of the establishment, but generally not because they are motivated to use one establishment's washroom over another's. With perhaps certain limited exceptions, a washroom facility does not drive foot traffic (and potential patrons) into a particular establishment.

The industry and public in general would benefit from a system and method that not only encourages proper washroom practices, but creates a marketing synergy and return for the establishments that host or otherwise make their washrooms freely available to the public.

SUMMARY OF THE INVENTION

Objects and advantages of the invention will be set forth in part in the following description, or may be obvious from the description, or may be learned through practice of the invention.

In accordance with aspects of the invention, a system and related method are provided for encouraging patron use of washrooms at commercial establishments. The type or numbers of commercial establishments are not limiting factors. The establishments may be, for example, any combination of restaurants (e.g., "fast-food" restaurants), service stations, convenience stores, retail establishments, and so forth. A plurality of these commercial establishments are enrolled in a washroom rewards program. A motivating factor for the commercial establishments is that the rewards program will tend to drive foot traffic into the establishment that would not otherwise occur, thereby generating increased sales/services.

The term "washroom" is used generically herein to encompass any manner of public, semi-public, or private facility visited by patrons to use sink or toilet facilities, bathing facilities, changing facilities, and so forth. Such facilities are also known as restrooms, toilet closets, public bathrooms, men's room, ladies' room, and the like. A typical public or semi-private washroom has a number of toilet facilities or urinals and sinks.

Patrons are also enrolled in the washroom rewards program, and may be any member of the general public. The patrons may be solicited for participation by any conventional manner, including direct advertising to the public. Patrons may be enrolled through their workplace, or any other organization. An efficient enrollment process may be conducted via a website maintained by the rewards program administrator, wherein the patrons may also establish their unique patron account.

The method further includes assigning respective point values in the washroom rewards program for defined washroom activities that are performed by the patrons in the washrooms of the commercial establishments. Such activities may include, for example, simply visiting the washroom, washing one's hands in the washroom, using soap, dispensing of a paper product in the washroom, dispensing a limited amount of a paper product (prevent waste), and so forth. The point values for such activities may be the same between different commercial establishments, or may vary from one establishment to another. The point values assigned to the different washroom activities are published to the patrons by any convenient means, for example via a website where the patrons can track the status of their personal account, via an application downloaded to the patron's mobile smart phone, via print material at the commercial establishment, and so forth.

In certain embodiments wherein the system and method are integrated with a "smart" washroom facility that has the capability to track and monitor the amount of product dispensed from certain types of dispensers, such as soap dispensers, toilet tissue dispensers, paper towel dispensers, and so forth, one of the defined washroom activities for which a point value is assigned may be the amount of a product dispensed from a dispenser in the washroom facility. For example, the patron may earn points for actually using soap when washing their hands, or using a proper amount of paper towels to dry their hands (as opposed to a wasteful number of towels). The sinks in such smart washrooms may also be equipped with a sensor that detects the actual run time of the faucet, wherein one of the defined washroom activities for which a point value is assigned is the amount of time the patron spends washing their hands. One of the display devices in the washroom facility may provide a timer that displays to the patron the actual time spent washing their hands.

The patrons are provided with the identity and location of the commercial establishments that participate in the rewards program. Again, this can be done by various means. In one embodiment, the patron is provided with an application or download to a mobile smart device, such as a smart phone, PDA, computer, or the like, wherein the application identifies participating commercial establishments in a region requested by the patron, or within a certain proximity to the patron's current location. This embodiment is particularly beneficial when patrons are travelling and need to make a rest stop. The application will provide the travelling patron with the ability to select an establishment within the rewards program, which benefits both the patron and the commercial establishment.

Upon a patron performing one of the defined washroom activities in one of the participating commercial establishments, the patron is identified and the patron's personal account is credited with the point value assigned to the defined activity. Under conditions established by the rewards program administrator, the patrons can redeem accumulated points in their respective account for an award or other value. For example, the award may be a gift certificate to one of the participating commercial establishments, merchandise, discounts, or any other award incentive that encourages patrons to enroll in the program.

In a particular embodiment, a personalized message is transmitted or displayed to the patron within the washroom, the personalized message identifying the patron by name and the point value earned by the patron for the performed washroom activity. The personalized message may contain any desired content. For example, the message may also encourage the patron to engage with the commercial establishment (e.g., make a purchase at the establishment), whereby the patron may earn extra or "bonus" points for such activity.

The personalized message may be delivered via a broadcast device within the washroom facility, which may be any one or combination of an audio device, video device, or audio-video device. For example, the broadcast device may be an audio-video screen that displays the personalized message in audio and visual format. In one embodiment, multiple such devices are located throughout the washroom facility and are operatively linked to a common receiver such that the multiple devices display generally the same message. In an alternate embodiment, the washroom facility comprises a plurality of individual functional locations, such as a plurality of toilet stalls or multiple sinks, with each of the functional locations having a respective receiver and associated broadcast device. With this configuration, multiple patrons at the various functional locations may be simultaneously provided with their own personalized message.

The system and method of the present invention may also be integrated with commercially available personal health tracking devices worn by patrons. Information from these devise may be used to generate a personalized message to the patron in the washroom facility that also includes personal health information obtained from the health tracker device worn by the patron.

In certain embodiments, the washrooms in the commercial establishments are configured with a transmitter device that broadcasts an ID signal unique to the commercial establishment on a continuous or intermittent basis. The patrons are provided with the capability to receive the unique ID signals on a mobile smart device carried by the patron (e.g., a smart phone) upon entry into the washroom. A central server is in communication with the commercial establishments and the patron's mobile smart device via a suitable wireless communications network. The central server identifies the patron, the particular commercial establishment, and the washroom activity performed by the patron, and automatically credits the patron's account with the point value for the washroom activity. This may be accomplished by various means. For example, in one system configuration, the transmitter device is a Bluetooth Low Energy (BTLE) beacon that emits a BTLE ID signal unique to the commercial establishment. The patron's mobile smart device is configured with an application that enables the device to receive the BTLE ID signal and transmit all or part of the BTLE ID signal (which includes a reconfiguration or modification of the BTLE ID signal) to the central server. This transmission provides the central server with information to identify the establishment and the patron (via content in the signal unique to the patron's smart mobile device). The central server may then generate a personalized message to the patron that identifies the patron by name. This message may be delivered to the patron via the patron's mobile smart device, or via a broadcast device in the washroom, such as an audio-visual ("AN") display in the washroom.

BRIEF DESCRIPTION OF THE DRAWINGS

FIG. 3 is a component diagram view of certain control components of a system and associated method for a washroom rewards program in accordance with the invention; and.

DETAILED DESCRIPTION OF THE INVENTION

Figure 1:
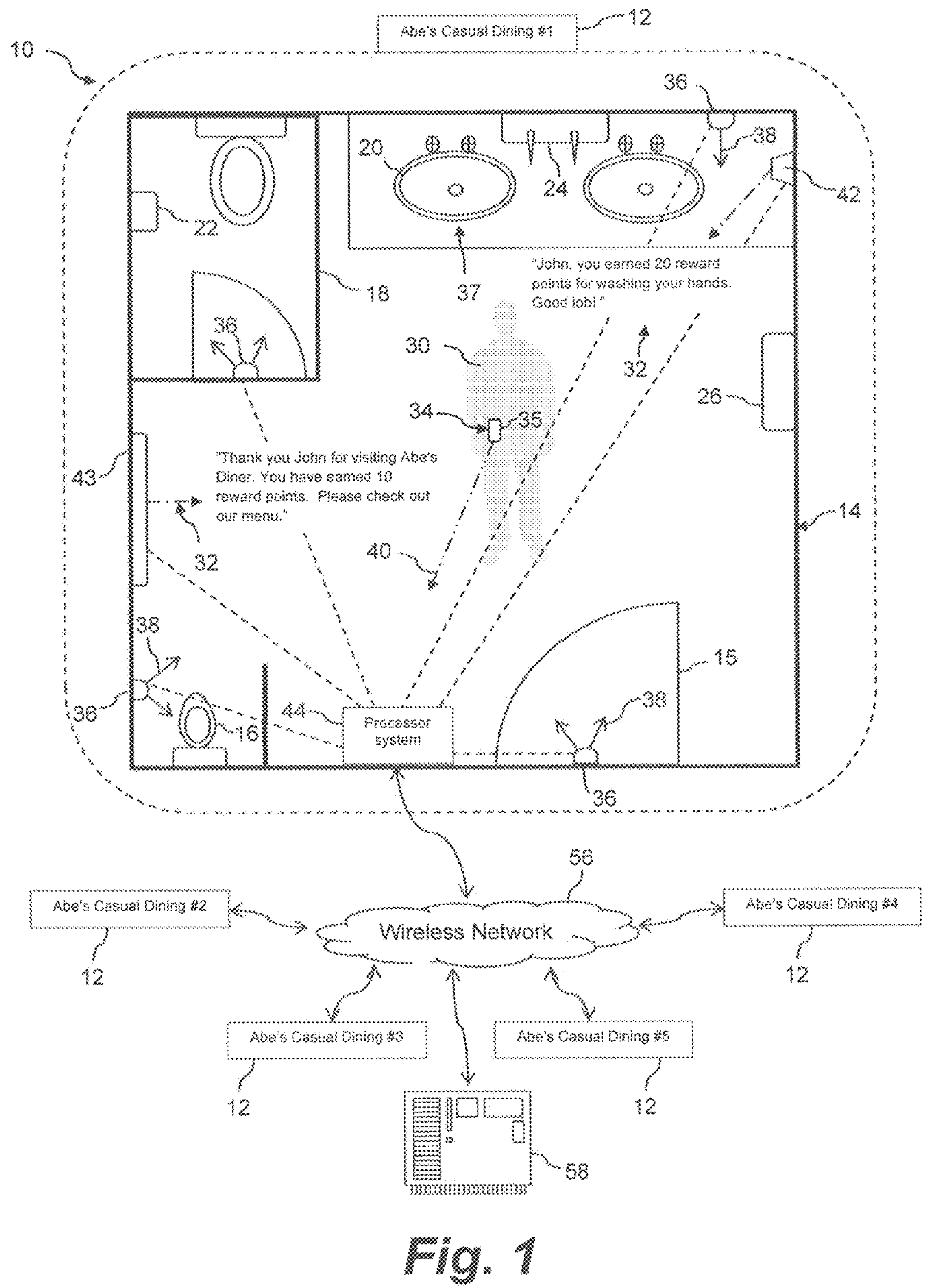
FIG. 1 is a diagram view of a washroom facility within a commercial establishment incorporating a system and associated method for a washroom rewards program in accordance with aspects of the present invention.

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

As mentioned, the present invention relates generally to a method and system wherein patrons are encouraged to use the washroom facilities of particular commercial establishments. Referring to FIG. 1, an embodiment of a system 10 is illustrated as a public or semi-private washroom facility 14 within a particular commercial establishment 12. A plurality of these commercial establishments 12 are enrolled in a washroom rewards program, wherein the program will tend to drive foot traffic into the establishment 12 that would not otherwise occur, thereby generating increased sales/services. The various establishments 12 may be, for example, any combination of restaurants (e.g., "fast-food" restaurants), service stations, convenience stores, retail establishments, and so forth.

The design and features of the washroom facility 14 depicted in FIG. 1 is for illustrative purposes only. The washroom facility 14 is depicted as a men's restroom facility having one or more individual stalls 18 (with individual toilets) and urinals 16. A number of sinks 20 are also provided. Any combination of other conventional washroom components may also be provided in the washroom facility 14, such as toilet tissue dispensers 22, soap dispenser 24, towel dispenser 26, and so forth. The individual stalls 18, urinals 16, and sinks 20, may be considered as "functional locations" 37 wherein an individual patron 30 may perform a desired washroom function within the facility 14. It should be appreciated that any manner of additional functional locations 37 may also be included in the washroom facility 14, such as shower stalls, dressing rooms, infant changing stations, and so forth.

The patrons 30 are also enrolled in the washroom rewards program, and may be any member of the general public. The patrons 30 may be solicited for participation by any conventional manner, including direct advertising to the public. Patrons 30 may be enrolled through their workplace, or any other organization. An efficient enrollment process may be conducted via a website maintained by a rewards program administrator, wherein the patrons 30 may also establish their own unique patron account where points earned in the program are automatically credited and tracked. It should be appreciated that the manner in which patrons 30 become enrolled in the washroom rewards program is not a limiting factor.

The washroom rewards program assigns respective point values to defined activities that are performed by the patrons in the washrooms 14 of the participating commercial establishments 12. Such activities may include, for example, simply visiting the washroom facility 14, washing one's hands in the facility, dispensing of a paper product in the facility, and so forth. The point values for such activities may be the same between different commercial establishments 12, or may vary from one establishment 12 to another.

The point values assigned to the different washroom activities are published to the patrons 30 by any convenient means, for example via a website where the patrons 30 can track the status of their personal account, via an application downloaded to the patron's mobile smart phone, via print material at the commercial establishment 12, and so forth.

Figure 3:
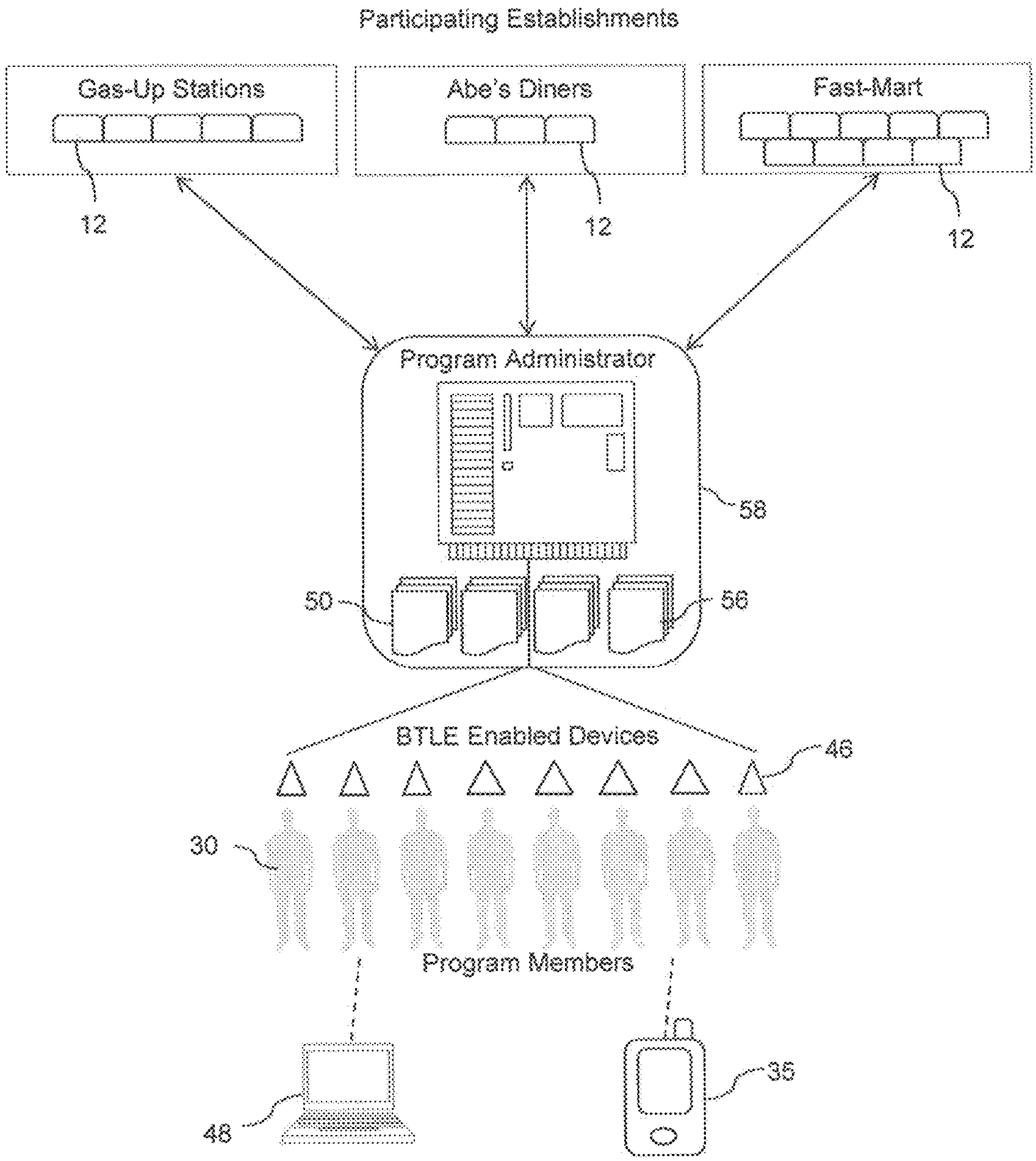
Figure 4:
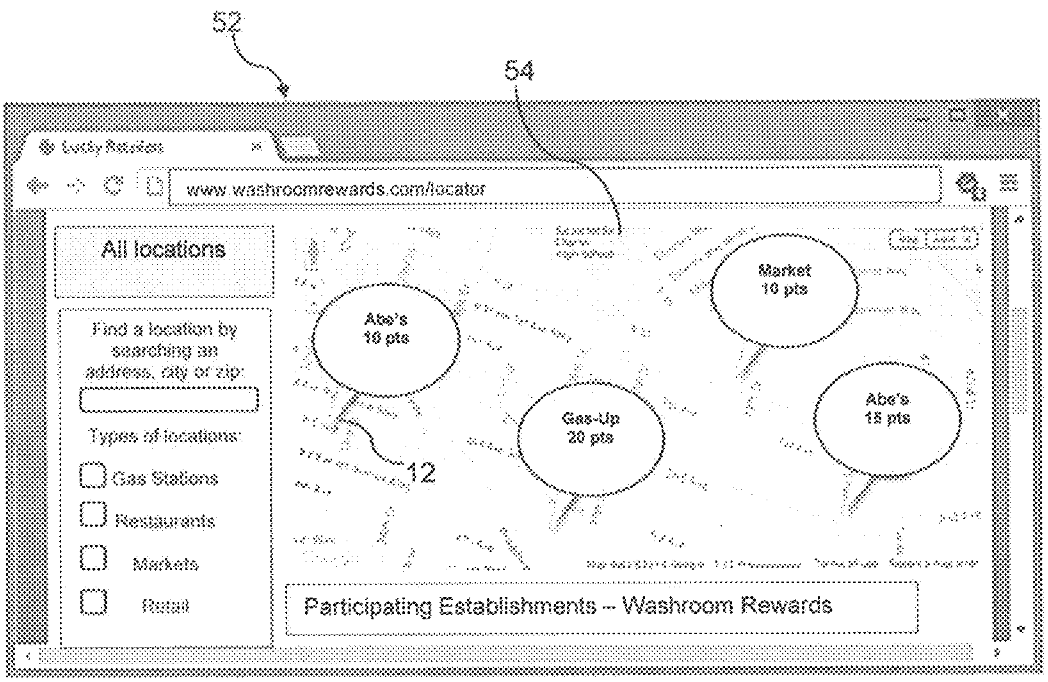
FIG. 4 is a screen shot that may be provided to patrons for locating commercial establishments participating in a washroom rewards program.

The patrons 30 are provided with the identity and location of the participating commercial establishments 12. Again, this can be done by various means. Referring to FIG. 3, in one embodiment, the patron 30 is provided with an application or download to their mobile smart device, such as a smart phone, PDA, computer, or the like, wherein the application identifies participating commercial establishments 12 in a region requested by the patron, or within a certain proximity to the patron's current location. FIG. 4 depicts a screen shot 52 wherein participating establishments 12 are identified on a map 54 centered on the patron's particular location, or on a location entered by the patron 30 via a menu. Each establishment 12 on the map 54 is also labeled with a point value assigned for simply visiting the particular establishment's washroom facility. This particular configuration is particularly beneficial when patrons 30 are travelling and need to make a rest stop.

Upon a patron 30 performing one of the defined washroom activities in one of the participating commercial establishments 12, the patron 30 is identified and the patron's personal account is credited with the point value assigned to the defined activity by a central server system 58. Under conditions established by the rewards program administrator, the patrons 30 can redeem accumulated points in their respective account for an award or other value. For example, the award may be a gift certificate to one of the participating commercial establishments 12, merchandise, discounts, coupons, or any other award incentive that encourages patrons to enroll in the program.

Figure 2:
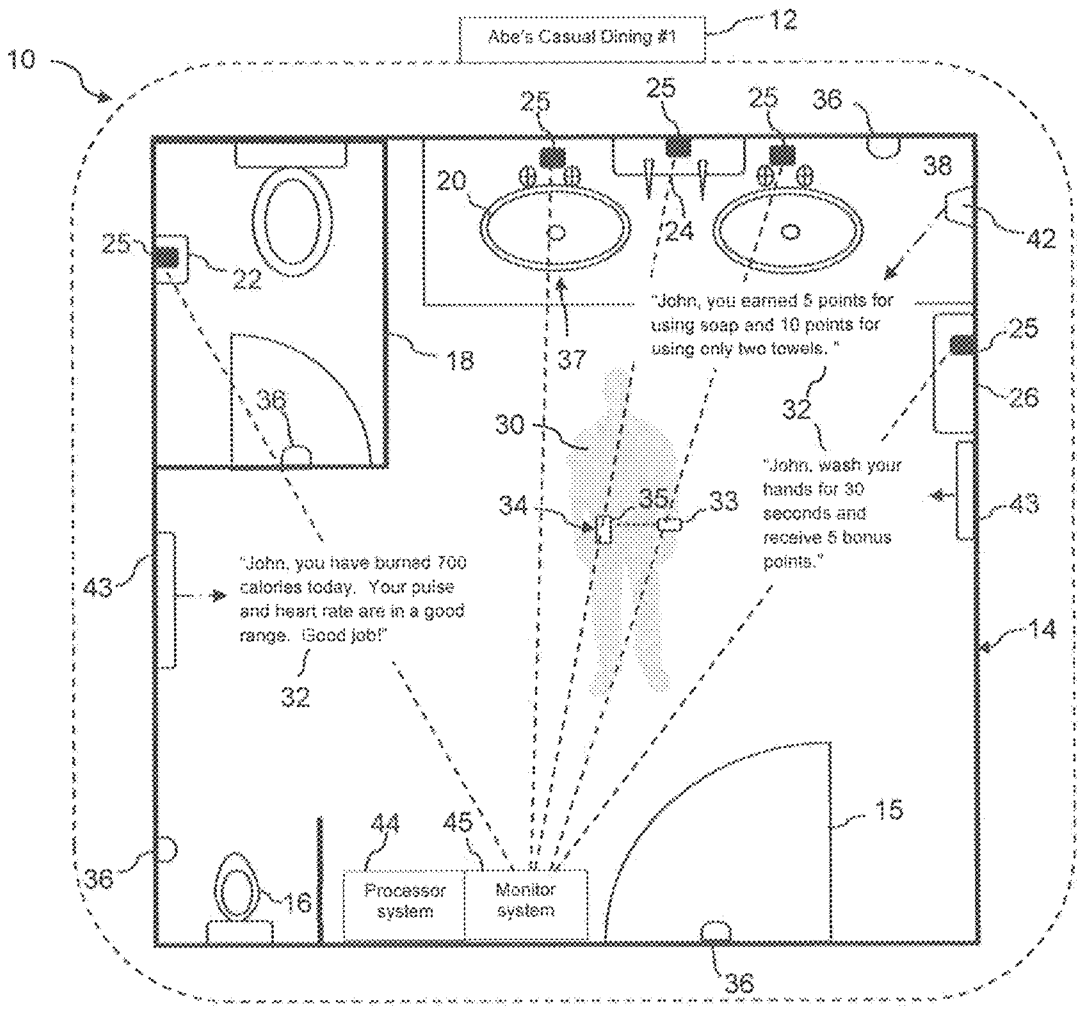
FIG. 2 is a diagram view of an alternate embodiment of a washroom facility within a commercial establishment.

Referring to FIGS. 1 and 2, to carry out the steps discussed above, the washroom facility 14 is configured with one or more transmitter devices 36 that are located within the washroom facility 14 to transmit an ID signal 38 that is unique to the particular commercial establishment 12. In the embodiment illustrated in FIG. 1, the washroom facility 14 includes a transmitter device 36 positioned above or near the entrance or door 15 to the facility 14. At this location, the transmitter device 36 is used to detect the individual patron 30 as they enter the facility 12. Respective transmitter devices 36 may also be located at the various functional locations within the washroom facility 14. As depicted in FIG. 1, a transmitter device 36 is located in the stall 18, adjacent the urinal 16, and adjacent the sinks 14. The ID signals 38 emitted by these transmitter devices 36 may also include information regarding their respective location within the washroom facility 14.

The patron 30 carries a receiver 34 that receives the unique ID signals 38 emitted by the various transmitter devices 38. These receivers 34 may be small, portable devices that are provided to the patrons 30 by the program administrator, for example in the form of a bracelet, token, key chain, and so forth. In a particularly unique embodiment illustrated in the figures, the receiver 34 is a mobile smart device 35, such as a smart phone, tablet, PDA, or other communication network-enabled device (all referred to herein generically as a "mobile smart device"), carried by the patron 30. The mobile smart device 35, runs a low-power background application previously downloaded by the patron 30 from a source (e.g. a website) maintained by the rewards program administrator. This application allows the mobile smart device 35 to function as a scanner or to receive the unique ID signals 38 if within range of the transmitter devices 36. Once the mobile smart device 35 detects a signal 38 from a transmitter device 36, certain other application functions are initiated. For example, the mobile smart device 35 will automatically "react" to the received signal 38 and start other communication applications wherein the smart device 35 automatically generates and transmits a communication 40 that is unique to the patron 30 and is received by the central server system 58 maintained by the program administrator. This communication or transmission 40 identifies the particular commercial establishment 12 and the particular patron 30, as discussed in greater detail below.

The transmitter devices 36 are strategically located at the various functional locations 36 within the washroom facility 14, wherein use of such locations 37 can be inferred by detection of the patron 30 at the location. For example, if the transmitter device 36 located near the sinks 20 detects a patron 30 for a defined period of time, it can be inferred that the patron 30 has washed their hands. Detection of the patron 30 with the transmitter 36 adjacent to the paper towel dispenser 26 for a defined period of time infers that the patron 30 has used towels from the dispenser 26.

Referring to FIG. 1, the system 10 includes a controller 44 that is in wired or wireless communication with the transmitters 36 located within the washroom facility 14. In the embodiment illustrated in FIG. 1, the controller 44 is located within the facility 14, for example within a control cabinet or other location in the washroom facility 14. The controller 44 is in communication with the program administrator's central server 58 via any suitable communications network 56 and includes any manner of hardware and software configuration to carry out the functions described herein, such as setting/controlling the various functions of the transmitter devices 36, as well as well as various broadcast devices 42, 43, as described in greater detail below.

As mentioned, the patron's mobile smart device 35 will generate and transmit a signal 40 once the device 35 detects a unique ID signal 38 from one of the transmitter devices 36. This signal will identify the particular patron 30 (e.g., via a smart device ID tag within the signal 40), as well as all or part of the ID signal 38 that identifies the commercial establishment 12 and the particular transmitter 36 within the washroom facility 14. The central server system 58 maintains a file 56 on each of the participating commercial establishments 12, and accesses the file 56 for the particular establishment 12 identified in the transmission 40 from the players mobile smart device 35. The file 56 includes the point values assigned to different washroom activities at the commercial establishment 12 (in particular at specific functional locations 37 in the washroom facilities 14), as well as any other relevant information regarding the establishment 12. The central server system 58 also maintains a file 50 for each of the patrons 30 enrolled in the rewards program. Upon identifying the patron, the respective file 50 is accessed, which may include any manner of personal information authorized by the patron, such as name, contact information, and so forth, as well as the patron's personal account to which the reward points are added and accumulated.

In a particular embodiment illustrated in FIG. 1, the patron's file information is retrieved by the central server system 58 and is used to generate and transmit back to the washroom facility 14 a personalized message 32 for the particular patron 30 that identifies the patron by name and informs the patron of the point value that has been credited to their account for the particular activity performed in the washroom facility 14. The message is transmitted via the controller 44 and a broadcast device 42, 43 within the washroom facility 14. For example, as depicted in FIG. 1, a broadcast device 42 in the form of a speaker is provided near the sinks 20 and transmits a personalized message 32 informing the patron 30 that he earned 20 points for washing his hands. Another broadcast device 43 is provided on a wall of the facility and is an audio/video (AN) device 64 that informs the patron that he earned 10 reward points simply for visiting the washroom facility 14. This AN device may be used to display any other type of information to the patron 30, such as merchandise on sale at the commercial establishment 12, menu items, and so forth. All of these devices 42, 43 are in communication with the controller 44 via a wireless communications network, as depicted by the dashed lines in FIG. 1.

In FIG. 1, a transmitter device 36 is disposed at or near the door 15 to the washroom facility 14 to transmit an ID signal 38 within a limited range that is received by the patron 30 upon initially entering the facility 14. However, once the patron 30 is within the facility 12, they can move beyond the range of this initial transmitter 36. If the rewards program for the particular commercial establishment 12 awards points for additional washroom activities at other functional locations within the facility 14, additional transmitter devices 36 may be located strategically throughout the washroom facility 14. For example, an additional transmitter device 36 is associated with the sinks 20 with a transmit range so that a patron 30 using the sink facility detects the signal 38 transmitted by the sink transmitter device 36. The signal 38 not only identifies the commercial establishment 12, but the particular location of the device 36 within the washroom 14. With this information, the central server system 58 can credit the patron 30 with the correct award points for a particular activity within the washroom facility 14. A transmitter device 36 may be located at the stall 18 and urinal 16, as depicted in FIG. 1. Thus, with this embodiment, a number of different patrons 30 may be within the washroom facility 14 using different ones of the functional locations and are individually detected by system. In addition, each of the functional locations may be configured with a respective broadcast device 42, 43 so that the respective patron 30 utilizing the individual functional location 37 can receive a personalized message 32 via the broadcast device associated with their functional location. For example, a patron 30 at one of the sink locations 20 may detect the unique ID signal 38 from the transmitter adjacent the sinks 20, wherein the patron's mobile smart device 35 generates the signal 40 that informs the central server system 50 that a particular patron 30 is at the sink 20 of a particular establishment 12 in the rewards program. The server system 58 generates and transmits a personalized message 32 that is played to the patron 30 at the sinks 20 informing the patron by name that their account has been credited with the assigned reward points for a hand-washing activity the commercial establishment 12. At the same time, a different patron may enter the washroom facility 14, and the same process is carried out for this patron to identify and award the points associated with visiting the washroom to the patron. Thus, the system can simultaneously differentiate between different patrons and different washroom activities.

The personalized messages 32 may be broadcast based on a time function. For example, the personalized messages 32 may be repeated for a set period of time in which it is expected that the patron 30 will remain in the facility 12.

As discussed with respect to FIGS. 1 and 2, each of the washroom facilities 14 is equipped with wireless communication capability between the transmitters 36 and the receivers 34 carried by the patrons 30, wherein an intermittently transmitted data packet (i.e., unique ID signal 38) is transmitted and received within a limited range. In this regard, the washroom facilities 14 are considered to be "communication-enabled" facilities. It has been found that Bluetooth Low Energy (BTLE) technology is particularly well-suited for purposes of methods and systems 10 in accordance with the present subject matter. For example, the transmitter devices 36 may be BTLE beacons that transmit the unique ID signal 38 as a BTE formatted signal, and the receiver 34 carried by the patrons 30 is configured as a BTLE scanner that receives and recognizes the BTLE formatted signal 38. As discussed, the patron's mobile smart device 35 may be configured to act as the BTLE scanner via an application downloaded to the device 35.

BTLE devices are well-known to those skilled in the art, and a detailed explanation of their function and operation is not necessary for an understanding and appreciation of the present invention. Briefly, BTLE beacons are a class of low-energy, low-cost radio transmitters that can notify a receiver running BTLE applications of their presence, which in turn enables the receiver to perform certain actions when in close proximity to the beacon. These devices are often referred to as "iBeacons", which is the name Apple chose for its implementation of the BTLE technology. Each BTLE beacon broadcasts a unique identification signal using the BTLE standard format. These unique signals are also known as iBeacon "advertisements." The BTLE receiver runs an application that enables the device to scan for and receive the signals within transmitting range of the BTLE beacons. The receiver will automatically "react" to the received signal and may start other BTLE-enabled applications for various purposes, including communication with a central server, which in this case is the reward program administrator's central server 58.

A typical use of BTLE technology is relatively precise indoor geo-location ("micro-location"). A BTLE-enabled application on a receiver (e.g., mobile smart device 35) detects when the receiver moves out of range of the BTLE beacon (transmitter 36), and thus is able to determine distance of the receiver from the transmitter 36. The exact geo-location of the transmitter 36 is known, and thus the exact location of the receiver (and patron 30) is calculated based on relative distance from the transmitter 36 as a function of signal strength. With this location information, the central server system 58 can generate a personalized message 32 to the patron 30 telling them, for example, that a nearby functional location in the facility 14 is available, or any other message related to the awards program, such as the status of the player's account or the points awarded for various activities within the washroom facility 14 or the commercial establishment 12 in general.

It should be appreciated that the present invention also encompasses embodiments wherein the device carried by the patron 30 acts as a transmitter, and receivers are strategically located throughout the washroom facility. For example, in certain embodiments, the BTLE beacon function may be incorporated with the patron's mobile smart device 35 that runs a low-power background application previously downloaded by the patron 30 from a source (e.g. a website) that allows the mobile smart device to function as a BTLE beacon that intermittently transmits a BTLE signal unique to the patron 30 during certain times of the day, for example during normal travel time to and from work, or other times programmed by the patron 30. The BTLE receivers in the washroom facility 14, upon detection of a BTLE signal from a patron 30, will transmit a signal to controller 44, which may in turn transmit a signal to the central server system 58 that identifies the commercial establishment 12 and information from the BTLE signal that enables the system 58 to identify the particular patron and access their file 56.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

FIG. 2 depicts an embodiment of the system 10 is incorporated with a "smart" washroom facility 14. With this type of facility, the consumable product dispensers, such as the paper towel dispenser 26, toilet tissue dispensers 22, and soap dispenser 24, are equipped with respective sensors 25 that detect the amount of product usage based on any number of operational principles, such as run time of the dispenser or direct measurement of the amount of product dispensed. Numerous types of these product dispensers are well known in the industry and a detailed explanation thereof is not necessary for purposes of the present disclosure. The product dispensers 22, 24, 26 are in communication with a monitoring system 45 via any manner of suitable wireless communication system (as indicated by the dashed lines in FIG. 2). Typically, the monitoring system 45 is a computer-implemented system that may be remotely located from the washroom facility 14. The monitoring system 45 may monitor a number of similarly-configured washroom facilities 14 within a building or site location. With this particular system 10, the processor system 44 is also in communication with the monitoring system 45 and, thus, can receive information regarding product usage in any one of the dispensers 22, 24, 26 located in the washroom facility 14. Information from the monitoring system 45 may be used as a basis for reward points and reflected in one or more of the personalized messages 32 generated and displayed or transmitted to the patron 30.

For example, referring to FIG. 2, the sensor 25 associated with the paper towel dispenser 26 detected that the patron 30 only used two towels (as opposed to a wasteful number of towels). This information is conveyed by the monitor system 45 to the processor system 44 (and central server 58), wherein reward points are assigned based on proper towel usage, and the personalized message 32 informs the patron that he earned ten points of using a proper number of paper towels. Although not reflected in FIG. 2, it is also within the scope of the present method and system 10 to deduct points from the patron's account for wastage or improper use of one of the dispensers 22, 24, 26. For example, if the patron 30 had used five paper towels, the personalized message may have informed him that five reward points were deducted from his account.

FIG. 2 also reflects that the sensor 25 associated with the soap dispenser 24 confirmed to the monitor system 45 that the patron 30 actually dispensed soap for his hand-washing activity. This action may qualify for reward points, as indicated by the personalized message 32 informing the patron 30 that five reward points were credited for using soap.

Still referring to FIG. 2, a sensor 25 is associated with each of the sinks 18 and detects the actual run time of the faucet wherein water is dispensed, e.g., for a hand-washing activity. Points may be awarded for a minimum amount of time the patron 30 spends washing their hands, as determined by the sink sensor 25. This information may be conveyed to the patron 30, for example via the AN display 43 located adjacent to the towel dispenser 26 that informs the patron that five bonus points will be credited to his account for spending at least thirty seconds washing his hands. Any one of the display devices 43 may initiate a timer that is visible to the patron and actually tracks the run time of the faucet (and thus the hand-washing time).

The present method and system 10 also encompass incorporating information from a personal health monitoring device 33 (FIG. 2) into the personalized messages 32 displayed or transmitted to the patron 30. For example, FIG. 2 depicts a personal health monitoring device 33 worn by the patron 30. This device 33 may be any one of a number of commercially available devices, such as a "UP3 Fitness Tracker" from Jawbone having a principal place of business in San Francisco, California, or one of fitness trackers available from FITBIT, Inc., having a principal place of business in San Francisco, California. These devices are compatible with most mobile smart device operating systems (such as the patron's smart phone 35) such that the health tracking data is uploaded and displayed to the user via their smart phone. As discussed above, in the embodiment wherein the patron's mobile smart device 35 is configured to function as the BTLE scanner via an application downloaded to the device 35, such application may also transmit the health tracking information from the device 33 with the signal 40 to the central server system 50. The server system 50 may use such information to generate a personalized message 32 provided to the patron 30 in the washroom facility 14. For example, FIG. 2 depicts a message 32 displayed on the A/V device 43 informing the patron of their calorie burn for the day and the status of their heart rate and pulse.

FIG. 3 depicts certain aspects of the present system and method wherein a plurality of different types of commercial establishments 12 are enrolled in the awards program. For example, one such enrollee is a group of five filling stations (the "Gas-Up" stations). Another participant ("Abe's Diners") has three restaurants in the program. A third participant ("Fast-Mart") has a chain of nine convenience stores in the program. All of these establishments 12 are in communication with the program administrator's central server system 58 via any suitable communications network. The system 58 includes a file 56 for each of the establishments 12, as discussed above. A plurality of program members 30 (patrons) are in communication with the central server system 58 via a BTLE enabled device 46, such as a mobile smart device as discussed above, wherein the device is configured as a BTLE enabled beacon or BTLE enabled receiver. As discussed, the system 58 maintains a file 50 for each patron 30, the file 50 including the player's updated reward points account. The program members 30 are able to access their personal account at any desired time via a computer 48, smart phone 35, PDA, tablet, or any other Internet-enabled device that provides access to a website maintained by the program administrator. The personal accounts may be password-protected.

Certain types of commercial establishments 12 may have multiple washroom facilities 14 within a single building or multiple buildings linked to a single central controller 44, which is in turn linked to the central server system 58. In this regard, a communications network is configured for these functions, wherein the individual components (e.g., transmitters 36, broadcast devices 42, 43) are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected and/or multiplexed to the network via the direct network links. Further, the direct network links may represent secure communications channels physically hardened against tampering and/or the communications may be encrypted to prevent unauthorized access to information transmitted thereon.

The central server system may include a host computer, which may be an integrated server, or include any manner of periphery server or other hardware structure. The central server system 58 may be a single networked computer, or a series of interconnected computers having access to the network via a gateway or other known networking system. Generally, the central server system 58 may include a central controller configured to manage, execute and control the individual transmitters 63, and to interface with the network enabled broadcast devices 42, 43 for retrieval/generation and play of the personalized messages described herein. The central controller may include a memory for storing reward program procedures and routines, a microprocessor (MP) for executing the stored programs, a random access memory (RAM) and an input/output (I/0) bus. These devices may be multiplexed together via a common bus, or may each be directly connected via dedicated communications lines, depending on the needs of the system.

The central server system 58 may be directly or indirectly connected through an I/O bus to any manner of peripheral devices such as storage devices, wireless adaptors, printers, and the like. In addition, a database (DB) may be communicatively connected to the central controller and provide a data repository for the storage and correlation of information gathered from messages 40 transmitted from the patrons 30.

It should be appreciated that the network-enabled devices (e.g., the individual transmitters and/or display devices) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The controller may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for encouraging patron use of washrooms at commercial establishments, wherein the commercial establishments are any one or combination of restaurants, service stations, convenience stores, or retail establishments, the method comprising:

enrolling a plurality of the commercial establishments in a washroom rewards program;

enrolling patrons in the washroom rewards program;

assigning respective point values in the washroom rewards program for defined washroom activities performed by the patrons in the washrooms of the commercial establishments;

providing identity and location of the commercial establishments participating in the washroom rewards program to the patrons that are within a defined distance from the patron's actual location or within a geographic region identified by the patron, the identity and location of the commercial establishments indicated on a map provided by an application running on a mobile smart device carried by the patrons;

upon the patrons performing one of the defined washroom activities in one of the commercial establishments, identifying the patron and crediting the point value for the defined activity to a player account assigned to the patron; and providing for the patrons to redeem accumulated points in their respective account for an award.

2. The method as in claim 1, further comprising delivering a personalized message to the patron via a broadcast device configured within the washroom, the personalized message identifying the patron by name and stating the point value earned by the patron for the performed washroom activity.

3. The method as in claim 1, wherein the application identifies the point value of one or more of the defined washroom activities at the commercial establishments indicated on the map.

4. The method as in claim 3, wherein one of the defined washroom activities includes entering the washroom, wherein the patron is awarded a point value for visiting the commercial establishment and entering the washroom.

5. The method as in claim 1, wherein points are also earned by the patrons for activities performed at the commercial establishments.

6. The method as in claim 1, further comprising configuring the washrooms in the commercial establishments with a transmitter device that broadcasts an ID signal unique to the commercial establishment, and providing the patrons with capability to receive the unique ID signals on a mobile smart device carried by the patron upon entry into the washroom, wherein a central server is in communication with the commercial establishments and the patron's mobile smart device and identifies the patron, the particular commercial establishment, and the washroom activity performed by the patron, the central server automatically crediting the patron's account with the point value for the washroom activity.

7. The method as in claim 6, wherein the transmitter device is a Bluetooth Low Energy (BTLE) beacon that emits a BTLE ID signal unique to the commercial establishment, the patron's mobile smart device configured with an application that enables the mobile smart device to receive the BTLE ID signal and transmit all or part of the BTLE ID signal to the central server.

8. The method as in claim 7, wherein the central server identifies the patron from the transmission from the patron's mobile smart device, and generates a personalized message to the patron that identifies the patron by name.

9. The method as in claim 8, wherein the personalized message is delivered to the patron via the patron's mobile smart device.

10. The method as in claim 8, wherein the personalized message is delivered via a broadcast device in the washroom.

11. The method as in claim 1, wherein one of the defined washroom activities for which a point value is assigned is the amount of a product dispensed from a dispenser in the washroom facility.

12. The method as in claim 1, wherein one of the defined washroom activities for which a point value is assigned is the amount of time the patron spends washing their hands.

13. The method as in claim 12, further comprising providing a timer display in the washroom facility that indicates actual hand washing time to the patron.

14. The method as in claim 1, further comprising generating and transmitting a personalized message to the patron in the washroom facility, wherein the personalized message includes health information obtained from a personal health tracker device worn by the patron.

* * * * *